United States Patent [19]

Anthony

[11] Patent Number: 4,624,870
[45] Date of Patent: Nov. 25, 1986

[54] SODIUM FREE SILICONE RESIN COATING COMPOSITIONS

[75] Inventor: Blair T. Anthony, Bergen op Zoom, Netherlands

[73] Assignee: General Electric Company, Schenectady, N.Y.

[21] Appl. No.: 786,778

[22] Filed: Oct. 11, 1985

Related U.S. Application Data

[63] Continuation of Ser. No. 671,255, Nov. 14, 1984, abandoned.

[51] Int. Cl.$^4$ .................. B05D 3/02; C08G 77/04
[52] U.S. Cl. .................. 427/387; 427/412.1; 428/412; 428/447; 524/379; 524/385; 524/389; 524/588; 528/21; 528/26
[58] Field of Search .................. 528/21, 26; 524/379, 524/385, 389, 99, 251, 257, 588; 428/412, 447; 427/387, 412.1

[56] References Cited

U.S. PATENT DOCUMENTS

| | | | |
|---|---|---|---|
| 3,986,997 | 10/1976 | Clark | 524/389 X |
| 4,177,315 | 12/1979 | Ubersax | 428/336 |
| 4,221,688 | 9/1980 | Johnson et al. | 525/119 X |
| 4,309,319 | 1/1982 | Vaughn, Jr. | 106/209 X |
| 4,348,431 | 9/1982 | O'Malley | 427/387 |
| 4,427,811 | 1/1984 | Elias et al. | 524/96 |
| 4,443,579 | 4/1984 | Doin et al. | 524/837 |

*Primary Examiner*—Thurman K. Page
*Attorney, Agent, or Firm*—James Magee, Jr.; James C. Davis, Jr.

[57] ABSTRACT

An improved silicone resin coating composition and a method for curing said compositions are provided, said composition comprises a dispersion of colloidal silica and a partial condensate in an alcohol/water solution having an alkaline pH provided by a base which is volatile at the selected cure temperature.

12 Claims, No Drawings

SODIUM FREE SILICONE RESIN COATING COMPOSITIONS

This application is a continuation of application Ser. No. 671,255, filed Nov. 14, 1984, now abandoned.

BACKGROUND OF THE INVENTION

This invention relates to silicone resin coating compositions and methods for producing silicone resin coatings on substrates. More particularly, it relates to silicone resin coating compositions having a basic pH provided by a volatile base, such as ammonia, and methods for producing coatings therefrom. These coatings demonstrate improved resistance to ultra violet light, stress, heat and humidity.

The substitution of glass with transparent materials which do not shatter has become widespread. For example, transparent glazing made from synthetic organic polymers is now utilized in public transportation vehicles, such as trains, buses and airplanes. Lenses for eye glasses and other optical instruments, as well as glazing for large buildings, also employ shatter resistant transparent plastics. The lighter weight of these plastics in comparison to glass is a further advantage, especially in the transportation industry where the weight of the vehicle is a major factor in its fuel economy.

While transparent plastics provide the major advantage of being more resistant to shattering and lighter than glass, a serious drawback lies in the ease with which these plastics mar and scratch due to everyday contact with abrasives, such as dust, cleaning equipment and/or ordinary weathering. Continuous scratching and marring results in impaired visibility and poor esthetics, oftentimes requiring replacement of the glazing or lens.

Attempts have been made to improve the abrasion resistance of these transparent plastics. For example, coatings formed from mixtures of silica, such as colloidal silica or silica gel, and hydrolyzable silanes in a hydrolysis medium have been developed to impart scratch resistance. U.S. Pat. Nos. 3,708,225, 3,986,997, 3,976,497, 4,368,235 and 4,324,712, describe such compositions and are incorporated herein by reference.

While these aforementioned coating formulations have been found acceptable, there still remains room for improvement. For example, this invention provides coatings having an added degree of resistance to moisture, heat, humidity and ultraviolet light, which does not exist in similar coatings provided in the patents referred to above.

Coating compositions known to the art, having a basic pH, usually contain the base sodium hydroxide since the colloidal silicas utilized in these compositions are stabilized with sodium hydroxide to prevent agglomeration or gelation of the colloidal dispersion. The colloidal silicas provide excess quantities of sodium hydroxide and the pH of the coating composition must be buffered with acetic acid or other suitable acids.

Sodium hydroxide is the predominant stabilizing species for basic colloidal silica sols since most commercial processes that produce colloidal silica utilize sodium silicate as a starting material, which generates sodium hydroxide.

Those colloidal silicas which contain sodium hydroxide, such as Ludox ® LS, are preferred in the coating compositions of the prior art. Sodium hydroxide is a nonvolatile base and will not vaporize from the coating composition during processing or upon application of said composition to a substrate.

It has been discovered that silicone resin coating compositions with an alkaline pH provided by a volatile base, such as ammonia, provide coatings with greater resistance to the elements than alkaline coating compositions which contain sodium hydroxide.

Not being bound by theory, it is believed that the superior properties are attributed to the reduced concentration of base and salts of the base in the cured coatings since the volatile base vaporizes from the composition during curing. Sodium hydroxide and the salts produced therefrom, such as sodium acetate, do not volatilize and remain in the cured coating. The alkaline species within the coating compositions and salts therefrom function as catalysts which promote the condensation reaction that cures the composition. It is further believed that when these alkaline species and their salts remain within the cured coating, they also catalyze hydrolysis reactions, which result in the formation of cracks in the coating under conditions of heat, humidity and ultraviolet light exposure.

All alkaline species, such as potassium hydroxide, calcium hydroxide, ammonium hydroxide and the like, including their salts, will provide catalysis for the hydrolysis reaction within the coating composition. However, where a volatile base is utilized, such as ammonia, the coating compositions can be cured under conditions so that a substantial portion of these catalysts are removed and cannot aid the formation of cracks. The coatings obtained therefrom exhibit greater resistance to humidity, heat, stress and ultraviolet light.

SUMMARY OF THE INVENTION

This invention provides improved silicon resin coating compositions and methods for preparing coatings therefrom. The coating compositions comprise a water-/aliphatic alcohol dispersion having an alkaline pH provided by a base which is volatile at the temperature selected for curing said composition. The preferred coating compositions of the invention comprise about 10–50 weight percent solids dispersed in a water/alcohol solution, these solids comprise colloidal silica, preferably about 10–70 weight percent, and a partial condensate, preferably about 30–90 weight percent, derived from organotrialkoxy silanes, preferably of the formula R'Si(OR)$_3$, wherein R' is selected from the group consisting of alkyl radicals having from 1 to 3 carbon atoms and aryl radicals of from 6–13 carbon atoms and R is selected from alkyl radicals of from 1 to 8 carbon atoms and aryl radicals of from 6–20 carbon atoms. The compositions provided have an alkaline pH, preferably from 7.1 to about 7.8, provided by a base which is volatile at the temperature selected for curing said composition. Included in this invention are methods for preparing silicon resin coatings which comprise (a) applying to a substrate a silicon resin coating composition of this invention, said silicon resin coating composition having an alkaline pH of from 7.1 to about 7.8 provided by a base which is volatile at the selected cure temperature, (b) heating the resulting composite to a temperature being sufficiently high to volatilize said base until the applied silicon resin coating composition is cured, said temperature falling within the range of from about 75° C. to about 150° C.

OBJECTS OF THE INVENTION

It is an object of the present invention to provide an improved silicon resin coating composition which, when applied to a substrate, is substantially free of species which catalyze the hydrolysis reaction.

It is another object of the present invention to provide an improved silicon resin coating composition which, when applied to a substrate, shows improved resistance to ultraviolet light, stress, heat and humidity.

It is another object of the present invention to provide a method for preparing silicon silicone resin coatings with improved weatherability.

It is a further object of the present invention to provide a method for preparing a coating which is substantially free of species which catalyze the hydrolysis reaction.

DETAILED DESCRIPTION OF THE INVENTION

The silicone resin coating compositions of this invention contain the hydrolysis product of an aqueous dispersion of colloidal silica and an organotrialkoxysilane. This hydrolysis product is maintained in an aqueous/alcohol solution having a basic pH to provide a stabilizing medium for the reactive species until the composition is cured. For compositions of this invention, the base utilized is volatile at the selected cure temperature.

The term "volatile base" as used herein are those bases having a boiling point within the range of temperatures utilized to cure the coating compositions. Cure temperatures for the coating compositions of this invention range from 75° C. to about 200° C., and preferably from about 100° to 150° C. Any base which is volatile within these ranges is suitable for use in this invention. Such bases are well known to those skilled in the art, examples of which include, alkyl amines of from 1 to 6 carbon atoms such as methylamine, ethylamine, t-butylamine, diethylamine, triethylamine, ethylenediamine; aromatic amines of from 5-7 carbon atoms, such as pyridine, aniline and methylaniline; ammonia; and the like.

Although the principle function of the base is to stabilize the coating composition by providing the desired pH, the volatile base also provides catalysis for the curing reaction and for the reaction which provides the partial condensate. A significant portion of the base utilized is often neutralized when adjusting the pH to the desired value. The salts obtained also provide catalysis for the curing reaction and the formation of the partial condensate. Volatilizing the base will also reduce the concentration of the salts because of the shift in equilibrium. The preferred bases are those which produce unstable salts upon neutralization which will dissociate at the cure temperatures described above. Where the salts of the base are unstable at the cure temperatures, a larger portion of the salt catalysts will be rendered ineffective upon volatilization of the base. An example of such a base is ammonia, which forms unstable salts with acetic and formic acids.

The preferred organotrialkoxy silanes utilized in this invention are of the formula, $R'Si(OR)_3$, wherein R is a monovalent radical selected from the group consisting of alkyl radicals of from 1 to 8 carbon atoms and aryl radicals of from 6-20 carbon atoms and R' is a monovalent radical selected from the group consisting of alkyl radicals of from 1-3 carbon atoms and aryl radicals of from 6-13 carbon atoms.

The aqueous dispersions of colloidal silica which can be utilized in the present invention have a particle size of from 5-150 millimicrons and preferably from 10-30 millimicrons average diameter. Such dispersions are known in the art and commercially available ones include, for example, those under the trademarks of Ludox (DuPont) and Nalcoag (Nalco Chemical Company). Such dispersions are available in the form of acidic or basic hydrosols. The commercially available basic colloidal silicasols typically provide a sufficient quantity of base to maintain the pH within the range of 7.1 to 7.8. Therefore, when utilizing the colloidal silicas, it is preferable that the alkaline species within the silica be volatile at the selected cure temperature. If the alkaline species is not volatile, and the desired pH is provided by said non-volatile base, such a colloidal silica is not desirable for use in this invention unless the non-volatile base is removed. Where the desired pH is not completely provided by the non-volatile base within the colloidal silica, such colloidal silicas can be utilized to achieve some of the desired objects of this invention.

Colloidal silicas which are initially acidic can also be used but the pH of the hydrolysis medium must be adjusted to be basic with a volatile base. Colloidal silicas having a low alkali content provide a more stable coating composition and these are preferred. A particularly preferred colloidal silica for purposes herein is known as Ludox AS, an ammonium stabilized colloidal silica sold by DuPont Company. Other commercially available ammonium stabilized colloidal silicas include Nalcoag 2326 and Nalcoag 2327, sold by Nalco Chemical Company.

In preparing the silicone resin coating compositions of this invention, the aqueous dispersion of basic colloidal silica is added to a solution of a small amount of glacial acetic acid (or alkyltriacetoxy silane) and an organotrialkoxy silane of the formula indicated above. Where an acidic colloidal silica is utilized, a volatile base is added to buffer the pH instead of acetic acid. The temperature of the reaction mixture is kept in the range between 20° C. to 40° C., preferably below 25° C. A reaction time of about 6-8 hours is usually sufficient to react enough of the organotrialkoxy silane such that the initial two-phase liquid mixture has been converted to a single liquid phase in which the colloidal silica is dispersed. Hydrolysis is usually permitted to continue for a period of about 8-48 hours. As a rule, the longer the time permitted for hydrolysis, the higher the final viscosity.

Silanols, $R'Si(OH)_3$, are formed in situ as a result of admixing the corresponding organotrialkoxysilanes with the aqueous dispersion of colloidal silica. Alkoxy functional groups, such as methoxy, ethoxy, isopropoxy, n-butoxy, and the like generate the hydroxy functional group upon hydrolysis and liberate the corresponding alcohol, such as methanol, ethanol, isopropanol, n-butanol, and the like.

During the preparation of the coating formulations from basic colloidal silica, alkyltriacetoxysilanes may be employed to buffer the viscosity of the initial two-phase liquid reaction mixture and to regulate the hydrolysis rate by producing acetic acid. Preferred are those alkyltriacetoxysilanes in which the alkyl groups contain from 1 to 5 carbon atoms and especially 1 to 3 carbon atoms. Methyltriacetoxysilane is the most preferred. These alkyltriacetoxysilanes will generate silanols in the same manner as organotrialkoxysilanes. As indicated above, an alternative to utilizing these alkyltriacetoxysilanes is to regulate the hydrolysis rate and buffer the pH through the use of glacial acetic acid or similar acid such as propionic, butyric, citric, benzoic, formic, oxylic, and the like.

Upon generating the hydroxyl substituents of these silanols, a condensation reaction begins to form silicon-oxygen-silicon bonds. This condensation reaction is not exhaustive. The siloxanes produced retain a quantity of silicon-bonded hydroxy groups, typically about at least one for every true Si-O units, which is why the polymer is soluble in the water-alcohol solvent mixture. This soluble partial condensate can be characterized as a siloxanol polymer having silicon-bonded hydroxyl groups and —SiO— repeating units.

A major portion of the partial condensate is obtained from $CH_3Si(OR)_3$, depending on the input of ingredient to the hydrolysis reaction. Minor amounts of the partial condensate are derived from $C_2H_5Si(OR)_3$, $C_3H_7Si(OR)_3$, $C_6H_5Si(OR)_3$, and the like where the corresponding organotrialkoxy silanes are used. It is most preferable to use only methyltrimethoxysilane for most silicone resin coating compositions, thus generating only a methyl-substituted partial condensate.

After hydrolysis has been completed, the solids content of the coating compositions is typically adjusted by adding alcohol to the reaction mixture. Suitable alcohols include lower aliphatics, e.g., having 1 to 6 carbon atoms, such as methanol, ethanol, propanol, isopropanol, butyl alcohol, t-butyl alcohol, and the like, or mixtures thereof. Isobutanol is preferred. A solvent system, i.e., mixture of water and alcohol, preferably contains from about 20-75% by weight of the alcohol to ensure that the partial condensate is soluble.

Optionally, additional water-miscible polar solvents, such as diacetone alcohol, butyl cellosolve, and the like can be included in minor amounts, usually no more than 20% by weight of the solvent system.

After adjustment with solvent, the coating compositions of this invention preferably contains from about 10-50% by weight solids, most preferably, about 20% by weight of the total composition. The nonvolatile solids portion of the coating formulation is a mixture of colloidal silica and the partial condensate of a silanol. In the preferred coating compositions herein, the partial condensate is present in an amount of from about 55-75% by weight of total solids, with the colloidal silica being present in the amount of from about 25-45% by weight based on the total weight of solids within the alcohol/water cosolvent.

The coating compositions of this invention preferably have a pH in the range of about 7.1 to 7.8 and most preferably from about 7.2 to 7.8. After the hydrolysis reaction, it may be necessary to adjust the pH of the composition to fall within these values. To raise the pH, volatile bases are preferred; such as ammonium hydroxide and to lower the pH, volatile acids are preferred, such as acetic acid and formic acid. These volatile acids have a boiling point which falls within the range of temperatures utilized to cure said compositions.

The coating compositions of this invention will cure on a substrate in approximately 2 hours at temperatures of about 120° C. Such a cure rate is obtained without the aid of additional cure catalysts. If milder curing conditions or an accelerated cure time are desired, it is preferable to add an additional amount of buffered or latent condensation catalyst to the coating composition. It is well known that alkaline coating compositions containing commercially available colloidal silica will generate cure catalysts in situ when the pH is adjusted below a value of about 8. The pH is typically adjusted with acetic acid, generating carboxylate catalysts from the alkaline species. In addition, the alkaline species within such compositions will provide some catalysis also.

Where additional catalysts are desired, it is preferable to utilize those catalysts which will volatilize on curing or will dissociate to a volatile species upon curing. Suitable examples are those catalysts based on ammonia or amines. These catalysts will dissociate to a volatile base upon curing. Examples include amine carboxylates, such as dimethylamine-acetate, ethylamine-acetate, dimethylaniline-formate, ammonium acetate, and the like; quaternary ammonium carboxylates, such as tetramethylammonium-acetate, benzyltrimethylammonium-acetate; amines, such as triethylamine, trimethylamine, pyridine, and the like, including ammonia. Where additional cure catalysts are utilized, cure times can be reduced to about 30 minutes.

Although other species which do not volatilize or dissociate to volatile species will provide catalysis, they are not desired since these catalysts will remain in the composition after curing. These catalytic species include alkali metal salts of carboxylic acids, such as sodium acetate, potassium formate, and the like, and the nonvolatile bases, such as sodium hydroxide and potassium hydroxide.

The amount of curing catalyst can vary widely, depending on particular requirements. In general, the catalyst is present in the amount of from about 0.05 to about 0.5 weight percent and preferably about 0.1% by weight of the total coating composition. Such compositions are curable on the substrate within a brief period of time by the process of this invention, e.g., from 30 to 60 minutes, using temperatures in the range of from about 75°-100° C. to provide a transparent abrasion resistant surface coating. Maintaining the pH in the range of 7.1-7.8 limits the quantity of base catalysts utilized.

Other ingredients may be present within the silicone resin coating compositions of this invention without a significant effect on achieving the desired objects. These additives are typically introduced to improve certain characteristics of the coatings obtained. For example, ultraviolet light-absorbing agents may be introduced, such as those disclosed by Anthony, U.S. Pat. No. 4,495,360 and Ashby et al., in U.S. Pat. No. 4,278,804 and by Fry in U.S. Pat. No. 4,299,746 of the basic formula

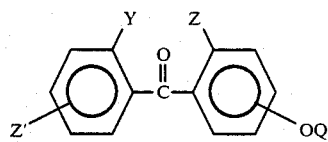

where Q varies in each reference but is of the general formula

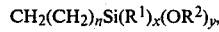

and $Z'$, $Z$, $Y$, $X$, $y$, $R^1$, $R^2$ and $n$ are more particularly defined in the respective references. The radicals $Z$ and $Y$ are more commonly H and OH, $R^1$ and $R^2$ are more commonly methyl, $y$ is typically 3 with $x$ and $n$ being zero.

These ultraviolet light-absorbing agents can be used in amounts of from about 1.0 to about 40.0, and preferably from about 5.0 to 20.0 parts by weight per 100 parts of the resulting hardcoat formulation on the basis of solids. The references described above are incorporated herein by reference.

Other ingredients which may be added include the flow modifiers which control flow and prevent flow marks, dirt marks and the like on the coating surface and increase the stress cracking resistance of the coating. These are typically polysiloxane/polyether copolymers having the formula

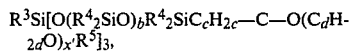

wherein $R^4$ and $R^3$ are monovalent hydrocarbons, $R^5$ is a lower alkyl, preferable alkyl having 1 to 7 carbon atoms, b is at least 2, preferably 2 to about 40, c is from 2 to 3, d is from 2 to 4 and x' is at least 5, preferably 5 to 100. By way of illustration, $R^4$ and $R^3$, independently are alkyls such as methyl, ethyl, propyl, butyl, octyl, and the like; cycloalkyls such as cyclohexyl, cycloheptyl and the like; aryl, such as phenyltolyl, naphthyl, zylyl, and the like; arylalkyl, such as benzyl, phenylethyl, and the like; alkenyl or cycloalkenyl, such as vinylallyl, cyclohexenyl, and the like and halogenated derivatives of any of the foregoing, such as chloromethyl, chlorophenyl, dibromophenyl, and the like. Illustratively, $R^5$ is methyl, ethyl, propobutyl, isobutyl, amyl and the like. Such polysiloxane-polyether copolymers are described with greater particularity by Fry in U.S. Pat. Nos. 4,308,315; 4,324,839 and 4,277,287 and are incorporated herein by reference. The preparation of the above polysiloxane polyether copolymers is further described in U.S. Pat. No. 3,629,165, also incorporated herein by reference. Suitable commercially available materials are SF-1066 and SF-1141, from General Electric Company, L-540 from Union Carbide and DC-190 from Dow Corning.

Other additives, such as thickening agents, pigments, dyes, antioxidants and the like can also be included for their conventionally employed purposes. These are typically added to the compositions after hydrolysis has been initiated. Thickening agents are more particularly described by Vaugh, Jr., U.S. Pat. No. 4,309,319; suitable adhesion promoting compounds ($\beta$-hydroxy ketones) are disclosed by Conroy, U.S. Pat. No. 4,311,763 and suitable antioxidants are described by Anthony U.S. Pat. No. 4,495,360 which are all incorporated herein by reference.

These compounds may be "ultrafiltered" as described by Anthony et al U.S. Pat. No. 4,499,224. The processes described therein are incorporated herein by reference.

The coating compositions of this invention can be applied to the surface of an article with or without priming of the said surface. Priming of the surface with a thermosetting acrylic prior to application of the silicone coating composition is often preferred and can be accomplished using conventional methods. The cured compositions are useful as protective coatings on a large variety of surfaces, either transparent or opaque, including plastic surfaces and metal surfaces. Examples of such plastics include synthetic organic polymeric substrates, such as acrylic polymers, example, poly(methylmethacrylate), and the like; polyesters, example, poly(ethylene terephthalate), poly(butylene terephthalate), and the like; polyamides, polyimides, acrylonitrile-styrene copolymers; styrene-acrylonitrile-butadiene terpolymers; polyvinyl chloride; butyrates, polyethylene, and the like.

Special mention is made of the polycarbonates, such as those polycarbonates known as Lexan ® polycarbonate resin, available from General Electric Company, including transparent panels made of such materials. The compositions of this invention are especially useful as protective coatings on the surfaces of such articles.

Also included in this invention are methods for curing silicone resin coating compositions. The silicon resin coating compositions which are cured by these processes have a basic pH provided by a volatile base. The volatile bases have a boiling point at or below a temperature in the range of 75° C. to 200° C., which is the range a suitable cure temperature for this process. The use of silicon resin coating compositions with a pH in the range of 7.1 to 7.8 is preferred, but those of a higher pH are also suitable. The use of silicon resin coating compositions of this invention is most preferred.

The coating compositions are first applied to a solid substrate. This can be accomplished by conventional methods such as flowing, spraying, or dip coating to form a continuous film or layer thereon. The coating thickness can be varied, but, in general, the coating will have a thickness in the range between about 0.5 to 20 microns, more usually from 2–10 microns.

The cured silicone resin coatings can be adhered to substantially all solid substrates. Therefore, the substantially all solid substrates are suitable for use in this process. Examples of suitable substrates include plastics, both opaque and transparent; metal surfaces, both bright and dull; wood; leather; glass; ceramics; textiles; and the like. The preferred plastic substrates are those described above as suitable for the silicon resin coating compositions of this invention. Most preferred are the polycarbonate substrates, particularly those known as Lexan ® polycarbonate available from General Electric Company.

After the silicon resin coating composition is applied to a substrate, it is heated to a temperature sufficiently high to volatilize the base within. The actual cure temperature utilized is determined by the volatilizing temperature of the volatile base, the cure temperature being at or above the temperature at which the base is volatile. The suitable cure temperatures fall within the range of 75° C. to 200° C. Heating to a temperature in this range will also volatilize the solvent and condense residual silanols in the partial condensate to provide a hard coating. Although the coating can air dry to a substantially tack free condition without heating and the temperature utilized may be significantly higher than is necessary to cure the coating composition, heating at the selected temperature (boiling point of base) is necessary in this process to provide coatings with improved weatherability. Where ammonia is the volatile base, a cure temperature of about 110° to 120° C. is preferred.

The final cure results in the formation of silsesquioxane ($RSiO_{3/2}$) moieties. In the final coating, the ratio of $RSiO_{3/2}$ units to $SiO_2$ will range from about 0.43 to about 9.0, preferably from 1 to 3 where R is methyl, the ratio is most preferably equal to 2.

In order that those skilled in the art will be better able to practice the invention, the following examples are given by way of illustration and are not provided to limit the invention to the embodiments described. All parts are by weight unless otherwise indicated.

EXAMPLE I

A coating composition within the scope of this invention was prepared by admixing 406 grams methyltrimethoxysilane and 2.5 grams acetic acid with 251 grams Ludox AS in 83 grams distilled water. The two phase solution was stirred at 20°–30° C. for about 16 hours. Then, 740 grams isobutanol, 12 grams of surface reagent SF-1066, described with greater particularity above, and 67 grams of "trimethoxy" SHBP-UV screener (52% in methanol), of the formula described above with Y and Z' being hydrogen, Z being hydroxy, n is 2, x is 0 and y is 3, were added within the solution and stirred at room temperature for one month.

This coating composition was flow coated on Lexan ® polycarbonate panels ¼"×4"×4". The coating composition was air dried for 30 minutes and then cured in a forced air convection oven for 1.5 hours at a temperature of 125° C. The resulting hard coating was smooth and clear and had no evidence of flow marks or stress cracking. The coated sample was tested for Taber abraser hardness in accordance with the procedures described below and provided a value of 5.1. The coated samples were also tested under QUV in accordance with the procedure described below and resulted in loss of adhesion (delamination) after 2000 hours. No microcracks were observed. In contrast, when a similar coating composition containing the nonvolatile base, sodium hydroxide, was prepared and cured in the same manner (251 gms Ludox ® LS, 406 gms methyltrimethoxysilane, 2.5 gms acetic acid, 83 gms water), a Taber hardness value of 5.0 was obtained but microcracks were observed after 1000 hours of exposure to QUV. Loss of adhesion resulted after 2000 hours of exposure to QUV.

EXAMPLE II

Three silicone resin coating compositions within the scope of this invention were prepared in a manner similar to that described in Example 1. A cure catalyst benzyltrimethylammonium acetate, was added to two of the compositions at various levels (0.15 weight % and 0.25 weight %) prior to coating. Three coated samples were obtained by flow coating each of the compositions on Lexan ® polycarbonate panels ¼"×4"×4", air drying for 30 minutes and curing the coatings in a forced air convection oven for 30 minutes at 125° C. A fourth coated sample was obtained by flow coating a ¼"×4"×4" Lexan ® polycarbonate panel with the composition containing 0% catalyst. This coating was also allowed to air dry for 30 minutes and then cured in a forced air convection oven for two hours at 135° C. Each of the samples were tested for Taber abrasion hardness, microcracks and loss of adhesion under QUV. The results are provided in Table I.

TABLE I

| QUV Agent of Sodium Free Silicone Hardcoats | | | |
|---|---|---|---|
| Sample No. | Catalyst Level | Taber Hardness | QUV Time to Microcrack | Quv Time to Loss of Adhesion |
| 1 | 0% | * | * | * |
| 2 | 0.15% | 4.5 | — | 1500 |
| 3 | 0.25% | 3.0 | — | 1500 |
| 4 | 0%** | 5.1 | — | 1500 |

*Coating failed initial adhesion under curing conditions
**Coating was cured for 2 hours at 135° C. in a forced air convection oven

EXPERIMENTAL

The adhesion tests referred to above comprised the cross-hatched method (ASTM-3359). In accordance with this procedure, coated Lexan ® polycarbonate was cut with a lattice cutting device and tested with adhesion tape (Scotch 710). Only 100% retention of adhesion after the third fresh tape pull was considered as passing.

The QUV tests referred to above were performed in a GM harsh cycle apparatus. The samples were exposed for 8 hours at 70° C. with UV light followed by 4 hours at 50° C. of darkness with condensation. Samples were observed for microcracks after each cycle. The surface was tested for adhesion during the wet cycle after one hour of exposure to water vapor.

The Taber Abraser Hardness Test referred to above was performed by placing coated polycarbonate samples in Abraser Model #174. The samples were exposed to 300 cycles in a 500 gram load using freshly sanded CS-10F wheels. The haze was measured with a Gardner haze meter, Model UX10. The values given in the Examples above represent the change in % haze.

Obviously, other modifications and variations of the present invention are possible in light of the above teachings. It is, therefore, to be understood that changes may be made in the particular embodiments described above which run within the full intended scope of the invention as defined in the appended claims.

What is claimed is:

1. A silica-containing coating composition, having an alkaline pH, comprising a water/aliphatic alcohol dispersion of ammonium hydroxide-stabilized colloidal silica and a partial condensate derived from organotrialkoxy silanes.

2. A silica-containing coating composition of claim 1 comprising from about 10 to 50 weight percent solids dispersed in a water/aliphatic alcohol mixture, said solids comprising about 10 to 70 weight percent ammonium hydroxide-stabilized colloidal silica and about 30 to 90 weight percent of a partial condensate derived from an organotrialkoxy silane of the formula R'Si(OR)$_3$ wherein R' is selected from the group consisting of alkyl radicals of from 1 to 3 carbon atoms and aryl radicals of from 6 to 13 carbon atoms and R is selected from the group consisting of alkyl radicals of from 1 to 8 and aryl radicals of from 6 to 20 carbon atoms, said composition having a pH of from about 7.1 to about 7.8.

3. A curable silica-containing silicone resin coating composition comprising a water/aliphatic alcohol dispersion of solids comprising ammonium hydroxide-stabilized colloidal silica and a partial condensate derived from organotrialkoxy silanes, said composition having an alkaline pH and being substantially free of a base which is non-volatile at the temperature selected for curing said coating composition.

4. A composition according to claim 1 wherein the aliphatic alcohol is selected from the group consisting of isopropanol, methanol, propanol, isobutanol, and ethanol and comprising from about 20 to about 70 weight percent of said composition.

5. A composition according to claim 1 which comprises between 30 to 40 weight percent solids, said solids comprising about 50 weight percent ammonium hydroxide-stabilized colloidal silica and about 50 weight percent partial condensate derived from organotrialkoxy silanes selected from the group consisting of silane, ethyltrimethoxy silane, phenyltrimethoxy silane, methyltriethoxy silane, ethyltriethoxy silane, phenyltriethoxy silane, propyltrimethoxy silane, and propyltriethoxy silane.

6. A method for making a silica-containing curable silicone resin coating composition which comprises admixing a water/aliphatic alcohol solution with solids comprising from about 10 to 70 weight percent ammonium hydroxide-stabilized colloidal silica and about 30 to 90 weight percent of a partial condensate of an organotrialkoxy silane and maintaining the pH of said coating composition at from about 7.1 to about 7.8 by use of a base which is volatile at the curing temperature of the composition.

7. A method of claim 5 wherein the base is volatile at a temperature between about 75 to 200 degrees centigrade.

8. A method according to claim 6 wherein the base is selected from the group consisting of ammonium hydroxide, aromatic amines containing from 5 to 7 carbon atoms, and alkylamines containing from 1 to 6 carbon atoms.

9. A method according to claim 6 wherein the partial condensate is derived from organotrialkoxy silanes selected from the group consisting of methyltrimethoxy silane, ethyltrimethoxy silane, phenyltrimethoxy silane, methyltriethoxy silane, ethyltriethoxy silane, phenyltriethoxy silane, propyltrimethoxy silane, and propyltriethoxy silane.

10. A method for coating plastic substrates with a silica-containing coating which comprises:
  (1) applying to the substrate a curable silicone resin coating composition having a pH between about 7.1 and 7.8 comprising ammonium hydroxide-stabilized colloidal silica and a partial condensate of an organotrialkoxy silane;
  (2) maintaining the pH of said composition by use of a base which is volatile at the temperature and selected for cure of the composition; and
  (3) curing the curable composition at a temperature sufficient to volatilize said base.

11. The method according to claim 10 in which the base is volatile at a temperature between about 75 and 200 degrees centigrade.

12. A method according to claim 10 wherein the aliphatic alcohol is selected from the group consisting of isopropanol, methanol, propanol, ethanol and isobutanol and the base is selected from the group consisting of ammonium hydroxide aromatic amines containing from 5 to 7 carbon atoms, and alkylamines containing from 1 to 6 carbon atoms.

* * * * *